United States Patent Office 3,511,119
Patented May 12, 1970

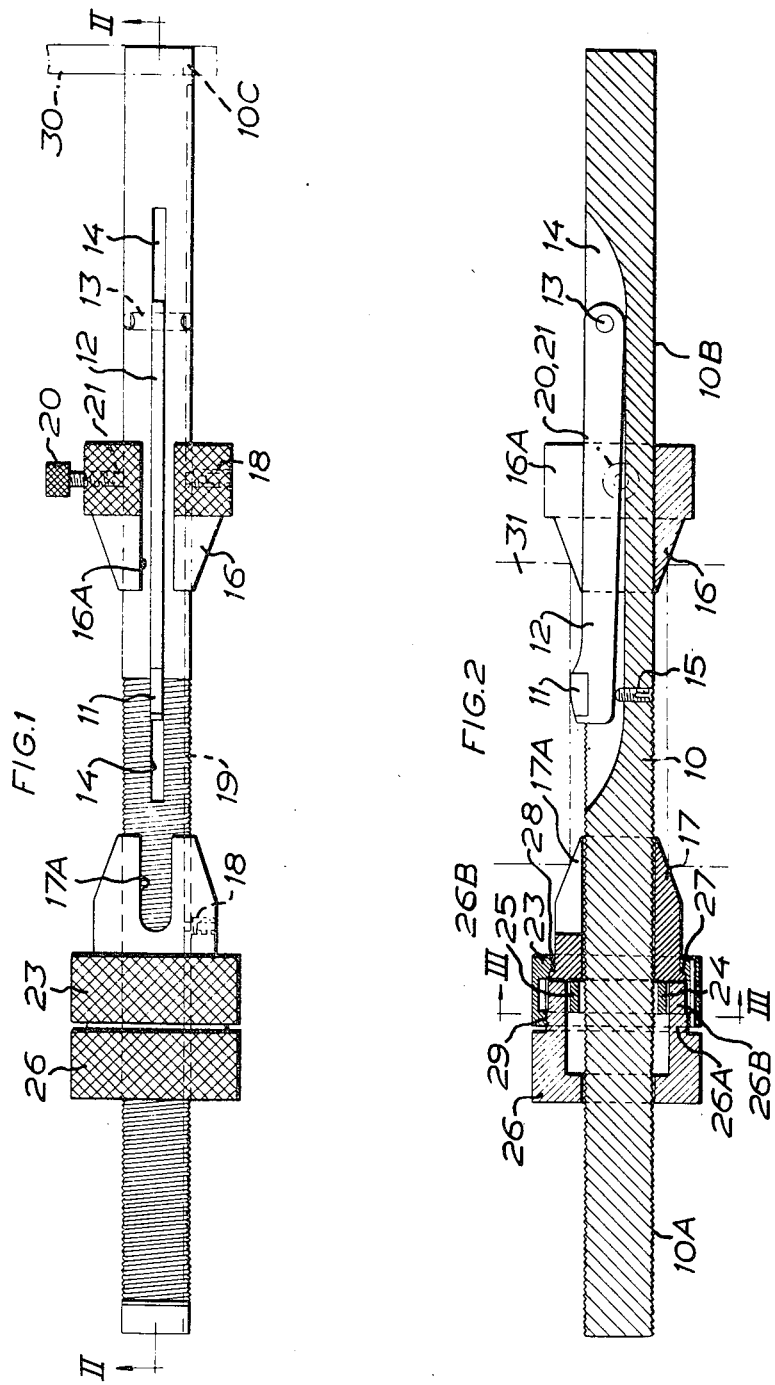

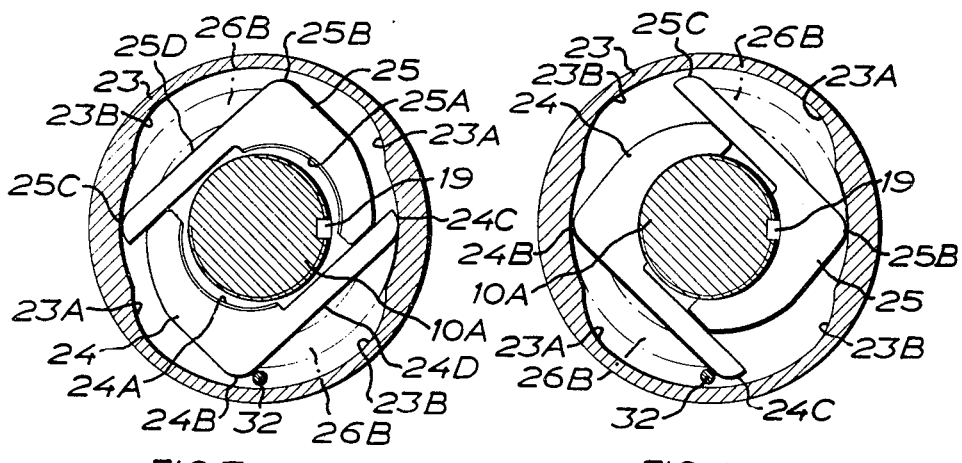
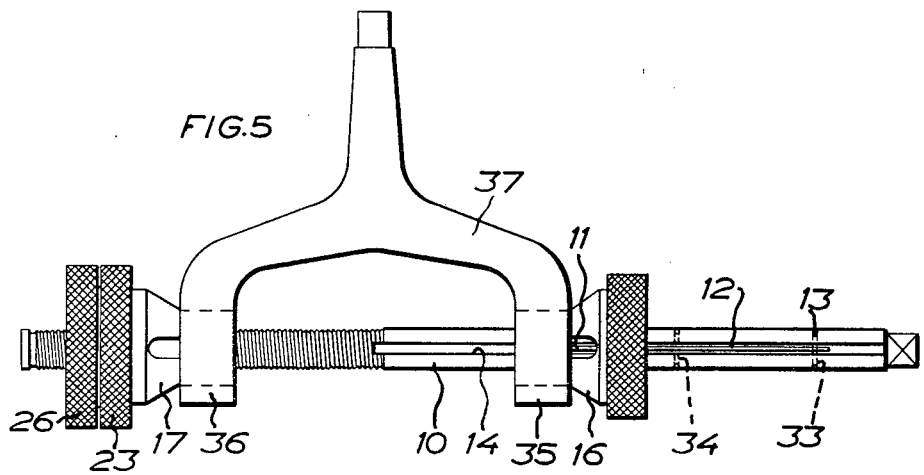

3,511,119
MANUALLY OPERABLE BORING TOOLS
Odd Werner Hielm, Eldsberga, and Gustaf Adolf Dahl, Halmstad, Sweden, assignors to AB Toolfix, Halmstad, Sweden
Filed Feb. 7, 1968, Ser. No. 703,574
Int. Cl. B23b 29/04
U.S. Cl. 77—57
4 Claims

ABSTRACT OF THE DISCLOSURE

A manually operable boring tool consisting of a boring bar provided with a cutting member and a pair of centering cones and partially threaded to be fed longitudinally through a bore by rotation in releasable thread engagement with a nut assembly associated with one of the cones, and sliding through the other cone which is provided with friction means to produce reaction forces holding the cones firmly set in the respective ends of the bore.

---

This invention relates to a boring tool primarily for reboring or reaming in situ of open-ended bearings. Such boring or reaming is often necessary at the repair of large machines, e.g. earth-working and like machines provided with bearings which are subjected to hard wear but cannot suitably be dismounted and set up in a machine tool for reboring.

Manual boring tools for this purpose are known already but would not seem to have been widely used by reason of their more or less poor operation, their low efficiency or inadequate resistance to wear and rough handling. For the most part reamers are used instead of such boring tools, which entails heavy costs for both tools and working time and does not give satisfactory results at all times.

The invention aims at overcoming this inconvenience by so improving the contemplated kind of boring tools that they will be more reliable and durable without too high prime costs. It is primarily the feed mechanism that is improved by means of a new nut assembly which provides a reliable thread engagement with the boring bar over the major part of its circumference and is positively manually operated to be engaged and disengaged with the boring bar for rapid adjustment by being shifted along said bar. In an embodiment, which might become the most important one commercially, the cutting member can be mounted at two or more different places of the length of the boring bar to permit boring bearings of greater length compared to the total length of the tool proper.

An embodiment of the invention is illustrated in the accompanying drawings in which:

FIG. 1 shows a side view of the tool;
FIG. 2 shows a section on line II—II in FIG. 1;
FIGS. 3 and 4 show an enlarged section on line III–IV in FIG. 2, with certain parts shown in different positions;
FIG. 5 shows a reduced side view of the tool in a modified embodiment which will presumably become the preferred embodiment.

The tool illustrated in FIGS. 1–4 comprises a boring bar 10, one half 10A thereof being threaded while the other half 10B is smooth. The boring bar carries a cutting member 11 secured to one end of an arm 12 which has the other end anchored by means of a pin 13 in a longitudinal groove 14 in the boring bar. Immediately beneath the cutting member 11 the arm 12 is supported by a setscrew 15 which is screwed into a threaded hole in the boring bar through the bottom of the groove 14.

The cutting member 11 can thus be adjusted radially, i.e. for different boring diameters.

At the free end of the non-threaded portion 10B the boring bar has a recess 10C which forms a grip for a crank 30 by which the boring bar can be rotated by hand, when centered in a bore in the manner described in the following, to cause the cutting member to work in the bore.

Centering of the boring bar 10 in a bore to be rebored is realized with the aid of a pair of cones 16 and 17 which are axially bored and passed onto the boring bar with the small ends in facing relation. The cones have close sliding fit on the boring bar and are non-rotatably guided thereon inasmuch as each cone has a guide pin 18 threaded thereinto and engaging a guide groove 19 in the bar.

The cone 16 which is localized on the smooth portion 10B of the boring bar 10 is equipped with friction means comprising a screw 20 which is screwed into a threaded hole in the cone and keeps a stud 21, for instance of some suitable synthetic plastics, engaged with the boring bar. Thus, the resistance to displacement of the cone 16 along the bar 10 can be adjusted as desired by means of the screw 20. The cone 16 further has a slot 16A aligned with the groove 14 of the bar 10, forming a passageway for the cutting member 11.

The other cone 17 which also has a slot 17A which accommodates the cutting member 11, shall be movable with close fit along the threaded portion 10A of the boring bar. The threads of the bar are therefore flat topped inasmuch as they are cut as ordinary pointed low pitch threads and ground slightly down to offer the cone a satisfactory centering guide surface. The cone 17 can be brought into and out of thread engagement with the threaded portion 10A of the boring bar by means of a nut assembly including an annular housing 23 containing a pair of nut segments 24, 25, and an actuating member in the form of a ring 26. The housing 23 is rotatably connected to the large end of the cone 17 with the aid of a flange 27 of the cone engaging an inner shoulder 28 in the housing, so that said housing and said cone are maintained coaxial, and the actuating ring 26 is rotatably connected to the housing 23 by thread engagement at 29 between a reduced portion 26A of the ring 26 and a part of the inner side of the housing 23.

As will be seen from FIGS. 3 and 4, the nut segments 24, 25 are L-shaped and assembled as a frame about the boring bar portion 10A, which frame is so arranged that the threaded portions 24A and 25A of the nut segments can be moved towards and away from each other, thus being engaged and disengaged with the threads of the boring bar. This movement is realized by rotation of the pair 24, 25 of nut segments in the housing 23 whose inner side is partly non-circular and forms two symmetrical pairs of cam surfaces 23A and 23B which upon rotation of the pair of nut segments actuate the outer corners 24B and 25B and the free leg ends 24C and 25C of said nut segments, respectively, depending upon clockwise or anti-clockwise rotation according to FIGS. 3 and 4. The rotation is limited to about 90° by a pin 32 inserted in the housing 23 and forming an abutment for one of the nut segments.

The rotation of the pair 24, 25 of nut segments takes place with the aid of the actuator ring 26 which has a pair of prongs 26B extending into the housing 23 and straddling the pair of nut segments, engaging opposite straight parallel surfaces 24D, 25D thereof.

When a bearing is to be rebored with the aid of the tool described in the foregoing, the cutting member 11 is first set for the desired boring diameter whereupon the cone 16 is moved inwardly to the middle of the boring bar 10 so that the cutting member will be in the slot 16A of the cone, and the screw 20 is tightened to provide the desired friction. The other cone 17 with the associated nut assembly is released and withdrawn from the boring bar. The threaded portion of the bar is inserted in and moved through the bearing until the cone 16 abuts one end of the bearing, whereupon the cone 17 with the nut assembly is again passed onto threaded portion of the boring bar so that the cone 17 abuts the other end of the bearing, and the actuator ring 26 is rotated in relation to the housing 23 so that the nut segments 24, 25 will engage the threads of the bar. Now the crank 30 is placed on the bar as indicated in FIG. 1, and boring is performed by the operator turning the crank 30 with one hand and retaining the actuator ring 26 against rotation with the other hand. In FIG. 2 there is indicated by dash-and-dot lines a bearing 31 being rebored, and by reason of the slot 17A of the cone 17 boring can proceed until complete boring of the bearing has been performed in one operation by rotating the cutting member 11 simultaneously as it is advanced through the bearing by reason of the thread engagement between the boring bar and the nut assembly 24, 25.

The embodiment of the tool shown in FIG. 5 corresponds to that shown in FIGS. 1–4 except that the groove 14 for the arm 12 with the cutting member 11 is extended and the boring bar has two spaced-apart holes 33, 34 for the pin 13 and two setscrews such as the screw 15 for adjusting the cutting member. By this modification the available boring length range is increased compared to the overall length of the tool and this is particularly convenient in the reboring of two coaxial bearings 35, 36 in a fork-shaped machine part 37. FIG. 5 illustrates the situation at the start of boring the first bearing 35, and this operation being concluded the pin 13 is removed from the hole 33 and the arm 12 with the cutting member is advanced and anchored with the pin 13 and in the hole 34, whereupon the second bearing 36 is bored. The requisite advance of the boring bar with regard to the cones has been shortened by the distance between the holes 33 and 34.

What we claim and desire to secure by Letters Patent is:

1. A portable manually operable boring tool comprising a boring bar (10) having a threaded portion (10A), a cutting member (11) radially adjustably carried by the boring bar, centering means consisting of a pair of axially bored cones (16, 17) embracing the bar for centering it in the ends of a bore to be rebored, both cones being slidably but non-rotatably guided on the boring bar and being slotted (16A, 17A) to provide passageways for the cutting member, friction means (20, 21) in one of the cones (16) for adjustable friction engagement with a non-threaded portion (10B) of the boring bar, an annular housing (23) for embracing the threaded portion of the boring bar and rotatably coupled to the large end of the other cone (17), a pair of L-shaped nut segments (24, 25) with threads (24A, 24B) on the inner side of one leg and assembled as a frame to embrace the threaded portion (10A) of the boring bar, and moving means for moving the nut segments into and out of thread engagement with the threaded portion of the boring bar, said moving means comprising two pairs of cam surfaces (23A, 23B) in the housing (23) acting upon opposite ends (24B, 24C, 25B, 25C) of the other leg of each nut segment upon rotation of the pair of nut segments in opposite directions in the housing, and an actuator ring (26) rotatably connected to the housing (23) and having a pair of prongs (26B) extending into the housing and straddling the pair of nut segments, and means (32) limiting rotation of the pair of nut segments in relation to the housing.

2. A tool as claimed in claim 1, in which the friction means in one of the cones (16) consists of a stud (21) in a threaded hole in the cone and of a screw (20) in the same threaded hole for application of the stud against the non-threaded part of the boring bar.

3. A tool as claimed in claim 1, in which the boring bar (10) is adapted for adjustably carrying the cutting member (11) in a plurality of different positions spaced longitudinally along the bar.

4. A tool as claimed in claim 1, in which the threads of the boring bar are cut as ordinary low pitch fastener screw threads and ground down to offer the cone an adequate centering guide surface.

References Cited

UNITED STATES PATENTS

| | | | |
|---|---|---|---|
| 937,480 | 10/1909 | Smith et al. | 287—52.08 |
| 1,309,375 | 7/1919 | Taylor | 248—414 |
| 1,952,342 | 3/1934 | Vedoe | 77—72 |
| 2,599,887 | 6/1952 | Besse | 77—2 |
| 2,636,403 | 4/1953 | Ballard | 77—2 |
| 2,667,323 | 1/1954 | Mason | 248—414 |
| 3,404,590 | 10/1968 | Sweeny | 77—58 |

FOREIGN PATENTS 985,173  2/1964  Great Britain.

GERALD A. DOST, Primary Examiner

U.S. Cl. X.R.

77—72